June 24, 1924.

H. G. KNAPP

WAGON AND TRUCK DUMP

Filed Aug. 9, 1923

1,498,843

2 Sheets-Sheet 1

INVENTOR
H. G. Knapp
BY
ATTORNEYS

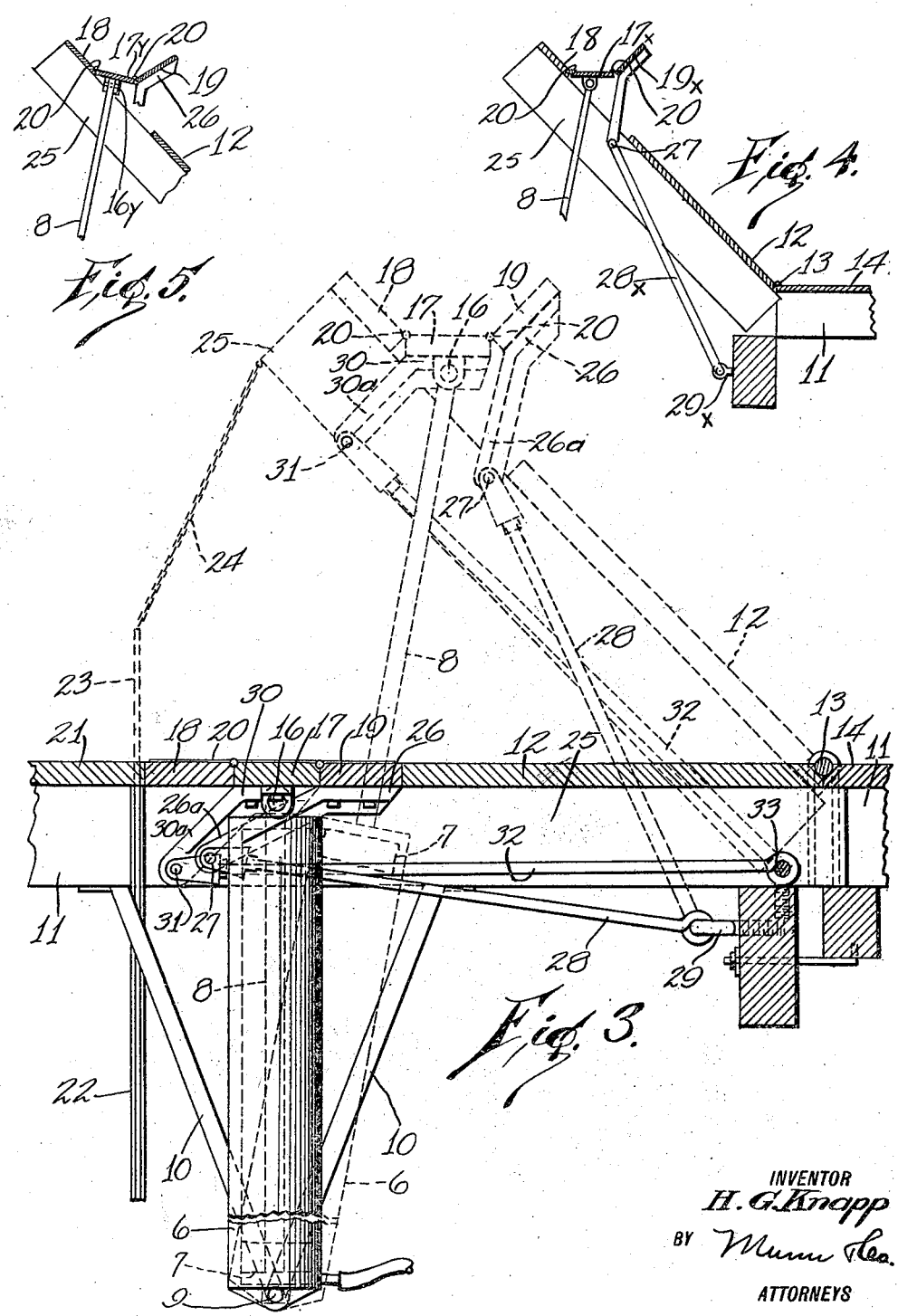

Patented June 24, 1924.

1,498,843

UNITED STATES PATENT OFFICE.

HARRY GROVE KNAPP, OF MINOT, NORTH DAKOTA.

WAGON AND TRUCK DUMP.

Application filed August 9, 1923. Serial No. 656,580.

*To all whom it may concern:*

Be it known that I, HARRY GROVE KNAPP, a citizen of the United States, and a resident of Minot, in the county of Ward and State of North Dakota, have invented a new and useful Improvement in Wagon and Truck Dumps, of which the following is a full, clear, and exact description.

My invention relates to improvements in wagon and truck dumps, and it consists in the combinations, constructions, and arrangements herein described and claimed.

This invention is an improvement over that disclosed in the application of William George Hancock and Leonard T. Stromswold, Serial No. 537,019, filed Feb. 16, 1922. In said prior application, a wagon and truck dump was disclosed, having means for automatically locking the wagon or truck in position while it is being dumped.

An object of the present invention is to provide a wagon and truck dump, which requires less power for its operation, owing to the novel arrangement of parts.

A further object is to provide a wagon and truck dump in which the apparatus is simplified, without, however, sacrificing its effectiveness.

A further object of the invention is to provide a device of the type described, which is cheaper to build, owing to the use of parts which do not require expensive machine operations.

Other objects and advantages will appear in the following specification, and the novel features of the invention will be particularly pointed out in the appended claims.

My invention is illustrated in the accompanying drawings, forming part of this application, in which—

Figure 1:
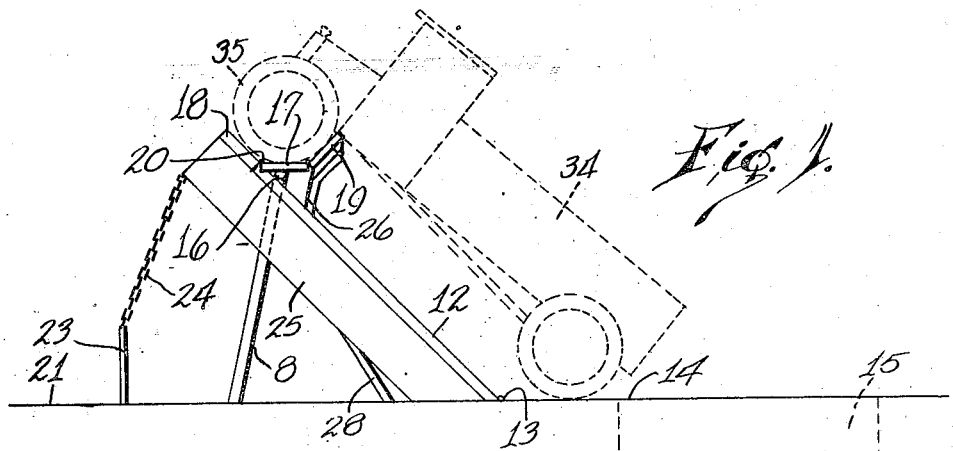
Figure 2:
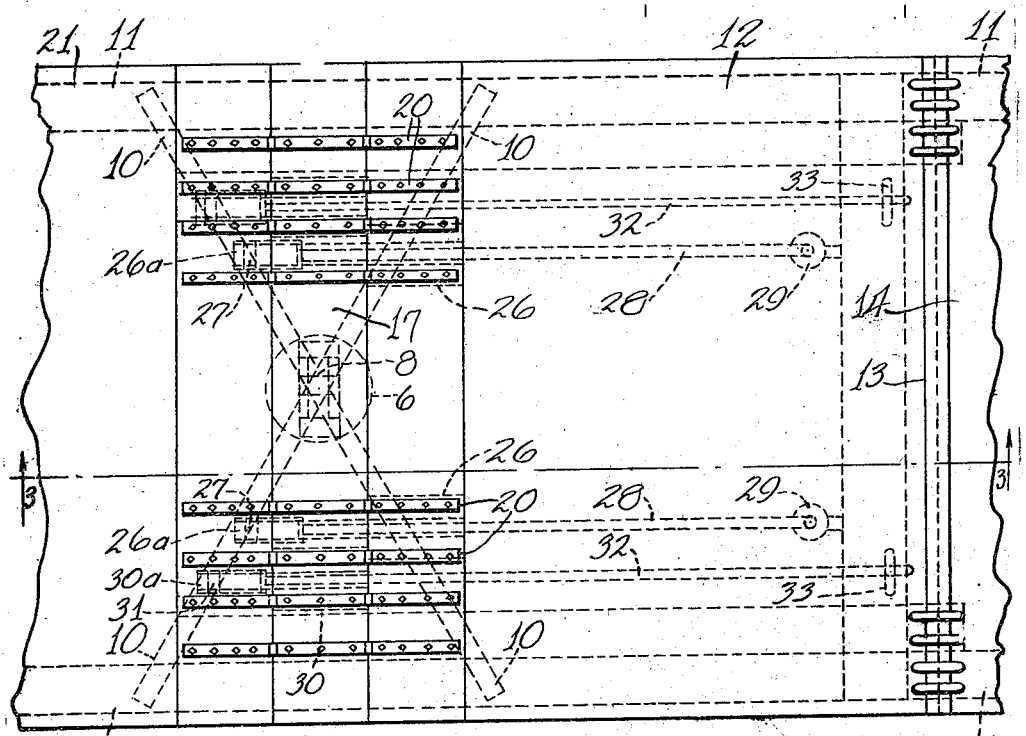

Figure 1 is a diagrammatic view showing the position of a truck while it is being dumped, Figure 2 is a plan view of the main portion of the device, Figure 3 is a sectional view along the line 3—3 of Figure 1, Figure 4 is a sectional view of a modified form, and Figure 5 is a sectional view of another modified form.

In the prior application mentioned, a truck dump was disclosed which was mounted on scales, so that the weighing of the truck and its contents might be accomplished when the truck is driven onto the dump. It will be understood that the present invention is also designed to be used in connection with scales, so that the weighing of the load may take place while the truck is on the dump, in a similar manner to that disclosed in the prior application.

In carrying out the present invention, I provide an air cylinder 6, having a piston 7 and a piston rod 8 extending through the opposite end. The lower end of the air cylinder 6 is pivotally supported on a stub shaft 9, which is carried by supports 10 secured to the underside of a frame 11 in any suitable manner.

A platform 12 is hinged at 13 to a suitable support 14. To the rear of the portion 14 is a grain receiving opening 15 (see Figure 1). The upper end of the piston rod 8 is hingedly secured at 16 to a supporting member 17, which is preferably a flat board. Similar boards 18 and 19 are secured to the central board 17 by hinges 20. The three hinged members 17, 18 and 19 are arranged to lie in parallelism with the platform 12, and also in parallelism with the floor portion 21 and 14, as shown in the drawing. The board 17 is really a part of the platform.

At 22, I have shown guideways for a slidable guard or gate 23, which is attached by a chain 24 to the forward part of the platform frame 25, so that when the platform is swung upwardly, the guard will be drawn upwardly, and thereby prevent horses, where horse-drawn vehicles are used, from backing into the opening left by the raised platform.

Secured to the hinged member 19 is a bracket 26, which has a portion 26ª extending downwardly at an angle. This angularly extending portion is pivotally connected at 27 by means of a rod 28, with a pivot member, such as on the eye bolt 29. The middle supporting member or board 17 has a similar bracket 30, with a downwardly extending inclined portion 30ª, which is pivotally connected at 31, by means of a rod 32, with a fixed pivot 33.

From the foregoing description of the various parts of the device, the operation thereof may be readily understood. A loaded wagon or truck 34 is driven on the dump. The front wheels 35 rest on the middle member 17 to which the piston rod 8 is connected. Compressed air is then let into the cylinder 6, by means of the inlet 35 (see Figure 3), and the piston 7 is forced upwardly, carrying with it the platform, until it reaches the dumping position shown in dotted lines in Figures 1 and 3. Owing to the pivotal connection of the side members 18 and 19, they are inclined so as to prevent the wheels from moving forwardly or backwardly, and thus the truck is locked in position while it is elevated.

In the construction disclosed in the prior application mentioned, the wheels were locked between two movable members forming a V. This construction exerts a pinching action, and thus requires considerable power to move the wheel upwardly, which would be necessary in order to allow for the movement of the locking members. In the present instance, there is no such pinching action. The entire weight upon the front wheels is borne by the middle member 17, and the outer members 18 and 19 merely act as stop members. As the platform is swung upwardly, the cylinder is moved from the full line position shown in Figure 3, to the dotted line position. The relation between the angular position of the side members 18 and 19 with respect to the middle member is determined by the length of the links or rods 28 and 32, and their pivotal connections. It is preferably designed so that the angular inclinations of the side members 18 and 19 to the middle member 17 is substantially the same. The middle member 17 remains in substantially a horizontal position, and to effect this the piston rod 8 is pivoted on an axis which is parallel with the pintles of the hinges 20.

The device is just as applicable to dumping sleighs as wheeled vehicles. The front runners may be located so that when the device is in dumping position, the runners will rest on the upper inner edges of the boards 18 and 19. This is sufficient to hold the sleigh in position, so that the body may be readily freed from its load.

In Figure 4, I have shown a modified form of the device. In this form, one of the side members 19$^x$ only is pivotally connected through the medium of the link 28$^x$ to the fixed pivot 29$^x$. The central portion 17 is not connected with the link, but is maintained in substantially horizontal position through the action of the side member 19$^x$. This simplifies the construction, and is suitable for lighter loads. Figure 3, however, shows the preferred construction for heavy work.

In Figure 5, I have shown a further modified form, in which the piston rod 8 is connected to the central member 17$^y$ by the pivot 16$^y$, whose axis is at right angles to the pintles 20 of the hinges. The central member 17$^y$ therefore is always at right angles to the piston rod 8. Either of these three forms of locking is accomplished automatically. When the truck is driven onto the platform, the air may be let in immediately, and the device raised to its dumping position, and when dumped, the air may be let out, when the parts will return by gravity to their normal position.

The device is relatively inexpensive to install, but is positive in action, and requires a minimum of power to elevate the load and dump it. The construction further obviates the necessity of exactly centering the wheels on the middle member 17. If the wheels should be either forwardly or rearwardly of the central member 17, they will be brought to the central position by the inclined side members, and there held while the load is being dumped.

It will be observed that the guard or gate 23 works in a perpendicular direction so as to give the best protection against horses backing against it. The attachment of the chain 24 to the gate at its bottom permits the gate to be raised vertically in the channel guide. When the platform starts down, it drops straight down by force of gravity.

I claim:

1. A vehicle dump comprising a tilting platform, a wheel support, hinged side members secured to said wheel support, means for raising the platform and the wheel support, and means for tilting the hinged side members to form stops for the wheels, whereby the movement of the vehicle is prevented.

2. A vehicle dump comprising a platform hinged at one end, a wheel support carried by the platform frame, and lying normally in the plane of the platform, side members hinged to said wheel support and also lying normally in the plane of the platform, means for raising the platform and the wheel support, means for maintaining the wheel support in substantially horizontal position, and for inclining the hinged side members relatively to the support, whereby the movement of the vehicle is prevented.

3. A vehicle dump comprising a platform hinged at one end, a wheel support carried by the platform frame, said support lying normally in the plane of the platform, a side member hinged to said support and constituting an extension of the platform, a second side member hinged to the support, a link pivotally connected to said second side member at one end, and to a stationary pivot member at the other end, and means for swinging said platform upwardly about its hinge, whereby said wheel support is caused to swing relatively to said first named side member to maintain a substantially horizontal position, and said second named side member is caused to swing relatively to said wheel support at substantially the same angle with respect thereto as the first mentioned side member.

4. A vehicle dump comprising a frame, a platform hinged to said frame at one end thereof, a wheel support carried by said platform and having a bracket secured thereto, a side member hinged to said wheel support and having a bracket, links connecting the brackets of said wheel support and said side member, with fixed pivot members, and means for elevating said wheel support, whereby said support and one of said side members is swung relatively to said platform, to provide means for preventing the movement of the vehicle when the platform is inclined.

HARRY GROVE KNAPP.